March 19, 1935.   C. L. FRY   1,995,097
DEMOUNTABLE WHEEL
Filed June 13, 1932

Inventor
Clark L. Fry
By Wheeler, Wheeler and Wheeler
Attorneys

Patented Mar. 19, 1935

1,995,097

UNITED STATES PATENT OFFICE 1,995,097

DEMOUNTABLE WHEEL

Clark L. Fry, Wisconsin Rapids, Wis.

Application June 13, 1932, Serial No. 616,830

1 Claim. (Cl. 301—9)

My invention relates to improvements in demountable wheels.

The object of my invention is to provide a demountable wheel particularly adaptable for use in automotive vehicles, but adaptable in principle and structure to any other type of wheel mounting.

More particularly stated, it is the object of my invention to provide a wheel structure and wheel mounting which are quickly severable and through which power may be applied. The structure thereof, including interacting lugs or wedges, must be readily under control of a device which quickly and automatically locks the reciprocable parts in wheel mounting position and which may be readily and quickly unlocked when the wheel is to be dismounted.

In the drawing.

Like parts are identified by the same reference characters throughout the several views.

Figure 1:
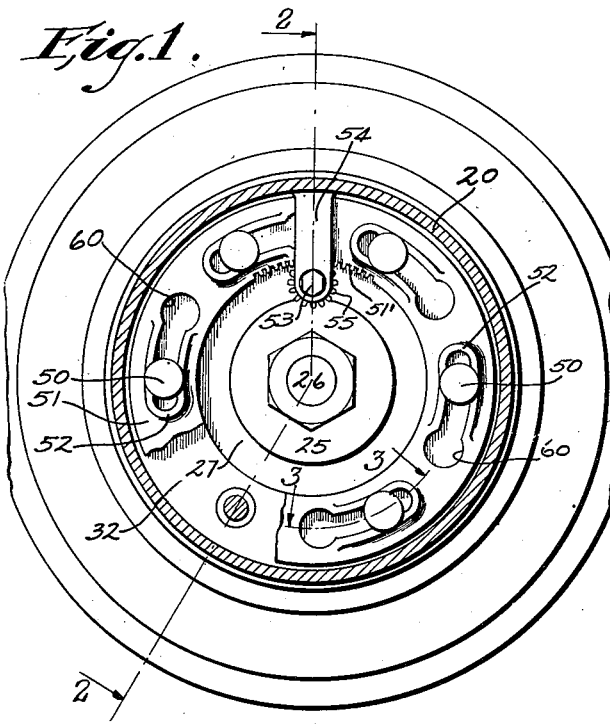
Fig. 1 is a vertical section through a wheel hub and discloses in elevation an axial view of a wheel hub mounting embodying my invention.

In the drawing I have illustrated the embodiment of my invention in a wheel structure including a hub 20 from which wire spokes 21 are radially extended. The hub is of considerable diameter and preferably made of pressed metal. It houses the various working parts used in my invention to secure the wheel structure to certain elements which I shall term the wheel mounting which includes a driving hub 25, mounted upon an axle or spindle 26, and a flange 27 formed preferably integrally with the drive hub 25.

Figure 2:
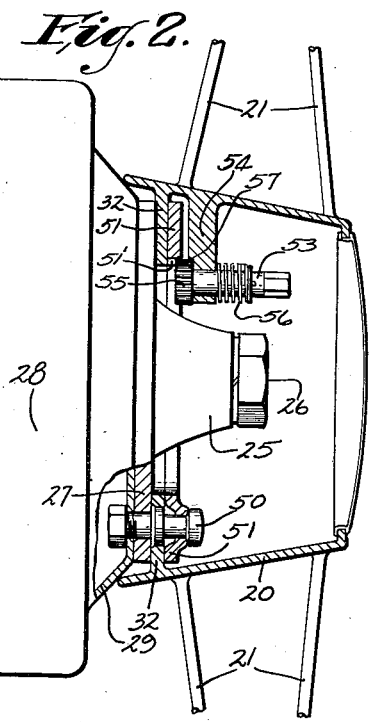
Fig. 2 is a section on line 2—2 of Fig. 1.
Figure 3:
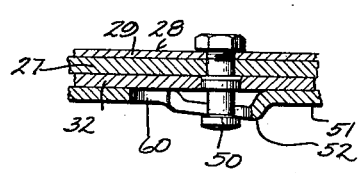
Fig. 3 is a section on line 3—3 of Fig. 1.

In addition to these parts included in the wheel mounting I provide the usual brake drum 28 which is provided with a radially internally extended and somewhat offset web flange 29 to which, as indicated clearly in Fig. 2, are secured a number of driving studs 50 which extend through driving hub flange 27.

The studs 50 are headed and are receivable through apertures in an inwardly, radially extending, drive receiving flange 32 forming a part of wheel hub 20, as shown clearly in Fig. 2. When the wheel hub is mounted upon the driving hub 25, with the wheel hub and the drive receiving flange in position upon the studs 50, a cam ring 51 provided with cam surfaces 52 slotted as shown most clearly in Fig. 1 and provided with enlarged apertures at 60 to receive the heads of the studs 50, may be placed against the outer face of the drive receiving flange 32.

Extending inwardly radially from the wheel hub 20 I provide a boss 54 spaced from the drive receiving flange 32. This boss provides a mounting for an actuator shaft 53 upon which is mounted, for positive rotation therewith, a pinion 55 normally held snugly against the boss 54 by means of spring 56 so that the pinion may in this position be locked positively to the boss 54 at 57, where the boss is provided with teeth to mesh with teeth of the pinion. The teeth of this pinion 55 are at all times in mesh with the teeth 51' upon the inner margin of the cam ring 51, thereby locking the cam ring 51 against rotation relative to the boss 54 and likewise locking the heads of the studs 50 in their position with reference to the cam faces 52 forming part of cam ring 51.

When relative rotation of the cam ring 51 with reference to the boss 54 is desired, the actuator shaft 53 is thrust inwardly axially to relieve the pinion 55 from its interlocking engagement with the boss 54, whereupon the actuator shaft 53 may be rotated by means of a wrench or other suitable tool to effect disengagement of the cam ring from under the heads of the studs 50 or, conversely, the actuator shaft may be oppositely rotated to cause the cam ring to be rotated to tightly wedge the cam surfaces of the cam ring 51 under the heads of the studs 50, whereby to lock the wheel hub 20 upon the driving hub 25.

I claim:

The combination with a wheel mounting, including an axle and a driving hub provided with axially extended wedge elements, of a wheel hub having an open center and provided with an inwardly projecting annular flange apertured to receive said wedge elements, an apertured wedge ring provided with a gear sector and mated with said inwardly projecting flange, whereby to engage said wedge elements extending through said flange, and a boss inwardly projected from said wheel hub, a shaft mounted in said boss and provided with a pinion movable axially into engagement with said gear sector on said wedge ring and retractible for fixed engagement with said boss and said gear sector to lock said wedge ring.

CLARK L. FRY.